(12) United States Patent
Taguchi et al.

(10) Patent No.: US 9,994,109 B2
(45) Date of Patent: Jun. 12, 2018

(54) POWER SUPPLY SYSTEM APPLIED TO ELECTRICALLY POWERED VEHICLE

(71) Applicant: TOYOTA JIDOSHA KABUSHIKI KAISHA, Toyota-shi, Aichi-ken (JP)

(72) Inventors: Etsushi Taguchi, Kasugai (JP); Akihiro Takahashi, Kariya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 268 days.

(21) Appl. No.: 14/955,317

(22) Filed: Dec. 1, 2015

(65) Prior Publication Data
US 2016/0152150 A1    Jun. 2, 2016

(30) Foreign Application Priority Data

Dec. 2, 2014   (JP) ................. 2014-244017

(51) Int. Cl.
*B60L 1/00* (2006.01)
*B60L 11/18* (2006.01)

(52) U.S. Cl.
CPC ....... *B60L 11/1803* (2013.01); *Y02T 10/7005* (2013.01)

(58) Field of Classification Search
CPC ...... B60L 11/1801; B60L 1/003; B60L 3/003; B60L 3/0038; B60L 3/0046; B60L 3/0061; B60L 3/0084; B60L 11/10; B60L 11/123; B60L 11/14; Y02T 10/7005; Y02T 10/7011; Y02T 10/7016; H02M 1/32; H02M 1/34

USPC ........................................ 307/10.1
See application file for complete search history.

(56) References Cited

U.S. PATENT DOCUMENTS

2013/0343105 A1* 12/2013 Kosugi ............... H02M 1/32
                                                      363/56.01

FOREIGN PATENT DOCUMENTS

| JP | 2007-008191 A | 1/2007 |
| JP | 2011-087406 A | 4/2011 |
| JP | 2014-023263   | 2/2014 |
| JP | 2014-212670 A | 11/2014 |

* cited by examiner

*Primary Examiner* — Patrick Chen
(74) *Attorney, Agent, or Firm* — Finnegan, Henderson, Farabow, Garrett & Dunner, LLP (57) ABSTRACT

A boost converter is configured of a boost chopper having a diode of an upper arm and a switching element of a lower arm. Output power from a battery to a load is limited such that a current flowing through boost converter does not exceed a current upper limit value for thermal protection of boost converter. The current upper limit value is set based not only on a cooling water temperature of boost converter but also on an output voltage VH of boost converter, in consideration of characteristics that, as output voltage VH rises, an amount of heat generated in diode decreases, diode being regarded as a main target of thermal protection since it receives a power running current to load. Thereby, the boost converter can be protected from overheating without excessively deteriorating vehicle traveling performance.

11 Claims, 8 Drawing Sheets

POWER SUPPLY SYSTEM APPLIED TO ELECTRICALLY POWERED VEHICLE

This nonprovisional application is based on Japanese Patent Application No. 2014-244017 filed on Dec. 2, 2014, with the Japan Patent Office, the entire contents of which are hereby incorporated by reference.

BACKGROUND OF THE INVENTION

Field of the Invention

The present invention relates to a power supply system, and more particularly to a power supply system applied to an electrically powered vehicle equipped with an electric motor for generating vehicle driving force and configured to include a boost converter for boosting a voltage from a power storage device.

Description of the Background Art

As a power supply system of an electrically powered vehicle such as an electric vehicle and a hybrid vehicle, for example, Japanese Patent Laying-Open No. 2011-87406 (PTD 1) discloses a configuration including a boost converter boosting a voltage from a power storage device and outputting the boosted voltage to a load.

PTD 1 discloses that the maximum value of the current flowing through a boost converter is set in accordance with the cooling water temperature of the boost converter, and the vehicle travelling duration in the state where the current is limited to the maximum value is learned. PTD 1 further discloses that the maximum value of the current flowing through the boost converter is corrected in accordance with the learned results.

SUMMARY OF THE INVENTION

According to the power supply system in PTD 1, the maximum value of the current flowing through the boost converter is lowered when the cooling water temperature rises, so that overheating of the boost converter can be prevented. However, since the limitation on the current of the boost converter leads to the limitation on the torque in the electric motor for generating vehicle driving force, the vehicle traveling performance is deteriorated. Accordingly, it is preferable that the maximum value of the current is set as high as possible.

Furthermore, the operation state of the boost converter, such as a boost ratio, also exerts an influence upon how many degrees the temperature rises in the boost converter. In PTD 1, however, the current upper limit value of the boost converter is set only in accordance with the resultant increase in the cooling water temperature, without taking any account of the operation state of the boost converter. Accordingly, the current upper limit value should be designed so as to accommodate the operation state in which the amount of temperature rise in the boost converter is the maximum. In other words, it can be said that the current upper limit value of the boost converter is still allowed to be lowered in the power supply system in PTD 1.

Therefore, an object of the present invention is to, in a power supply system of an electrically powered vehicle configured to include a boost converter for boosting a voltage from a power storage device and outputting the voltage, protect this boost converter from overheating without excessively deteriorating the vehicle traveling performance.

According to an aspect of the present invention, a power supply system of an electrically powered vehicle equipped with an electric motor for generating vehicle driving force is provided. The power supply system includes first and second power lines, a power storage device, a boost converter, a cooling device, and a control device. The first power line is a power line on a high voltage side connected to a load including the electric motor. The second power line is a voltage line on a low voltage side connected to the load. The power storage device is provided for storing electric power supplied to the electric motor. The boost converter is connected between the power storage device and the load. The boost converter includes a diode, a switching element, and a reactor. The diode is connected between the first power line and a first node so as to form a current path extending from the first node to the first power line. The switching element is connected between the first node and the second power line. The reactor is connected in series to the power storage device between the first node and the second power line. The cooling device is configured to have a coolant circulation mechanism for cooling the diode and the switching element. The control device is configured to control an operation of each of the boost converter and the load. The control device includes a voltage control unit, an upper limit current setting unit, and a power limitation unit. The voltage control unit is configured to control the switching element to be turned ON or OFF in order to control a direct-current (DC) voltage between the first and second power lines. The upper limit current setting unit is configured to change a current upper limit value of the boost converter in accordance with a change in each of a coolant temperature of the coolant circulation mechanism and the DC voltage. The power limitation unit is configured to limit electric power of the load such that a current flowing through the boost converter does not exceed the current upper limit value.

According to the above-described power supply system, the current upper limit value for thermal protection of the boost converter including a boost chopper formed of a diode of an upper arm and a switching element of a lower arm can be set based not only on the coolant temperature but also on the output voltage of the boost converter. Accordingly, the current upper limit value can be changed in consideration of the characteristics that, as the output voltage of the boost converter rises, the amount of heat generated in the diode decreases, the diode being regarded as a main target of thermal protection since this diode receives a power running current to the load. As a result, the current upper limit value for thermal protection can be set as appropriate such that the output power from the power storage device to the load is not excessively limited. Accordingly, the boost converter can be protected from overheating without excessively deteriorating the traveling performance of the electrically powered vehicle.

Therefore, a main advantage of the present invention is that, in a power supply system of an electrically powered vehicle configured to include a boost converter for boosting the voltage from a power storage device, the boost converter can be protected from overheating without excessively deteriorating the vehicle traveling performance.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The embodiments of the present invention will be hereinafter described in detail with reference to the accompanying drawings. In the following description, the same or corresponding components are designated by the same reference characters, and description thereof will not be repeated in principle. Furthermore, although a plurality of embodiments will be hereinafter described, it has been originally intended to combine the configurations described in each embodiment as appropriate.

First Embodiment

Figure 1:
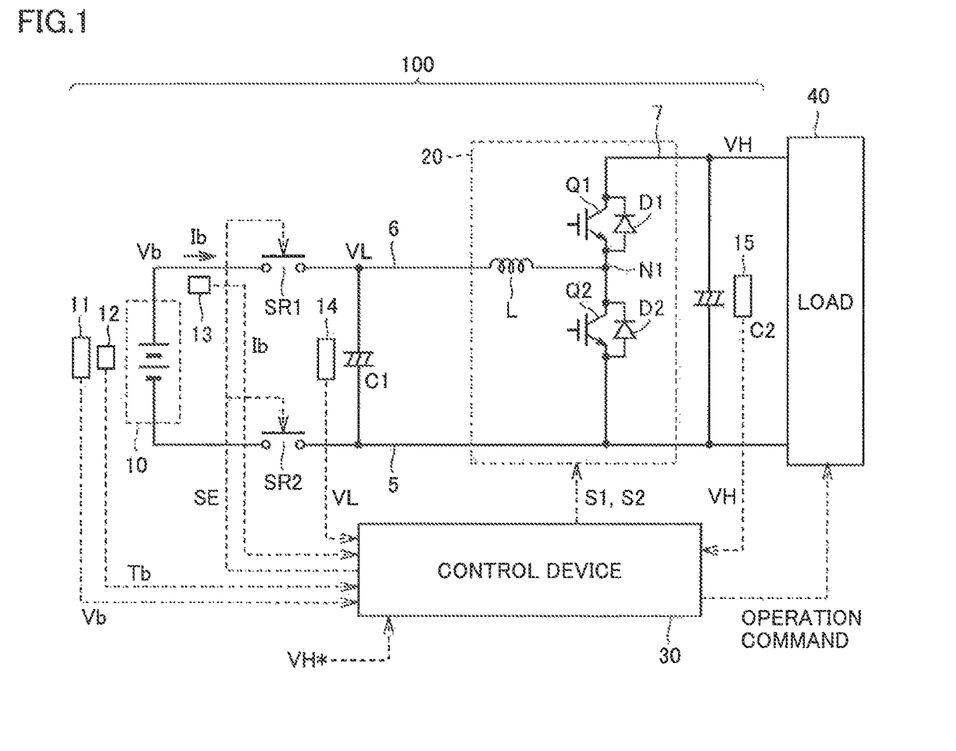
FIG. 1 is a block diagram illustrating the configuration of a power supply system according to the present embodiment.

FIG. 1 is a block diagram illustrating the configuration of a power supply system according to the present embodiment.

Referring to FIG. 1, a power supply system 100 according to the embodiment of the present invention includes a power storage device 10, system relays SR1 and SR2, smoothing capacitors C1 and C2, a boost converter 20, and a control device 30.

Power storage device 10, which is a rechargeable DC power supply, is representatively configured of a battery such as a lithium-ion battery or a nickel-metal hydride battery. Alternatively, power storage device 10 can be configured also of an electric double layer capacitor or the like. In the following, power storage device 10 will be also referred to as a battery 10.

Battery 10 is provided with a voltage sensor 11 for detecting an output voltage Vb (battery voltage), a temperature sensor 12 for detecting a battery temperature Tb, and a current sensor 13 for detecting an output current Ib from battery 10.

System relay SR1 is connected between a positive electrode terminal of battery 10 and a power line 6 while system relay SR2 is connected between a negative electrode terminal of battery 10 and a power line 5. System relays SR1 and SR2 are turned ON/OFF by a control signal SE from control device 30. Smoothing capacitor C1 is connected between power line 6 and power line 5.

Boost converter 20 is connected to a load 40 through a power line 7 on the high voltage side and power line 5 on the low voltage side. Boost converter 20 controls a DC voltage VH between power line 7 and power line 5 in accordance with a voltage command value VH*.

DC voltage VH is supplied to load 40. Load 40 operates with the electric power from power storage device 10 in accordance with the control command from control device 30 (power running operation). Alternatively, load 40 may be configured to include a power generation function. In this case, load 40 operates in response to the control command from control device 30 to thereby generate charge power for power storage device 10 (regenerative operation). The electric power from load 40 during the regenerative operation is supplied through boost converter 20 to power storage device 10 for charging thereof.

Since boost converter 20 is formed of a non-insulation type boost chopper circuit, power line 5 is electrically connected in common to load 40 and power storage device 10. Smoothing capacitor C2 is connected between power line 7 and power line 5.

Boost converter 20 includes a reactor L, power semiconductor switching elements Q1 and Q2, and diodes D1 and D2.

Power semiconductor switching elements Q1 and Q2 are connected in series between power line 7 and power line 5. In the embodiment of the present invention, a power semiconductor switching element (which will be hereinafter simply referred to as a "switching element") can be an IGBT (Insulated Gate Bipolar Transistor), a power MOS (Metal Oxide Semiconductor) transistor, a power bipolar transistor, or the like. Diodes D1 and D2 are connected in anti-parallel to switching elements Q1 and Q2.

Power semiconductor switching elements Q1 and Q2 are controlled to be turned ON or OFF (switching operation) by switching control signals S1 and S2 from control device 30. Reactor L is electrically connected in series to battery 10 through system relays SR1 and SR2 between power line 6 and a connection node N1 of switching elements Q1 and Q2.

In addition, in boost converter 20 shown in FIG. 1, power line 7 corresponds to the "first power line", power line 5 corresponds to the "second power line", and connection node N1 corresponds to the "first node". Furthermore, diode D1 corresponds to a "diode", and switching element Q2 corresponds to a "switching element".

Figure 2:
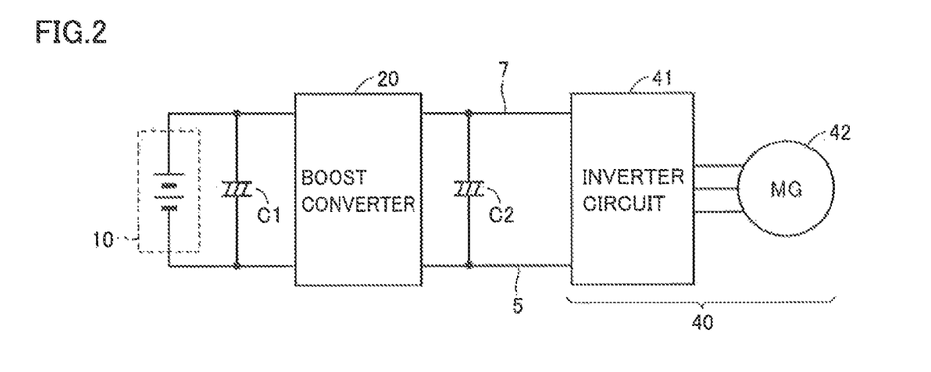
FIG. 2 is a block diagram illustrating the first configuration example of a load in FIG. 1.
Figure 3:
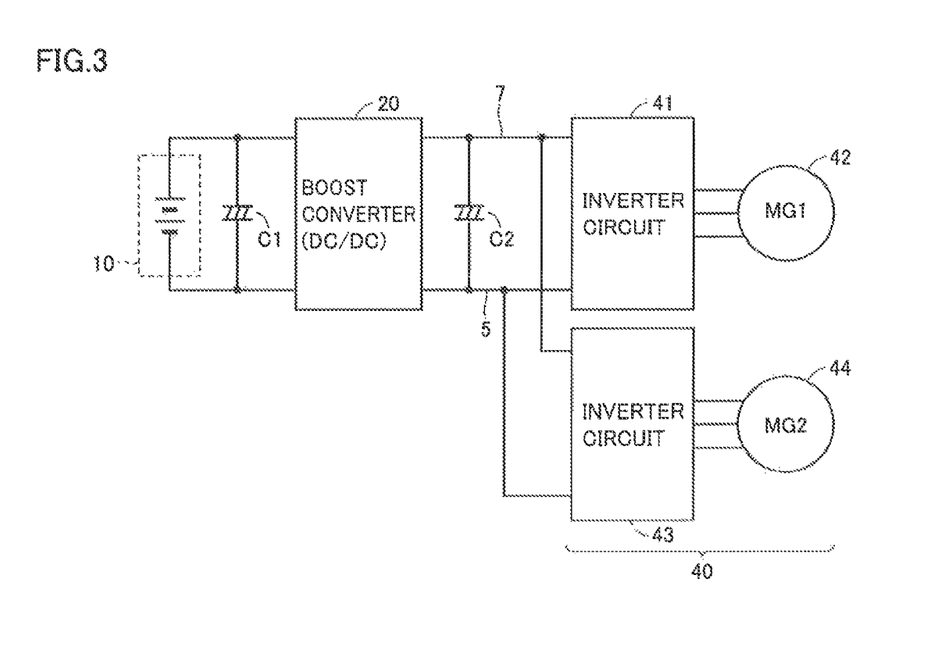
FIG. 3 is a block diagram illustrating the second configuration example of the load in FIG. 1.

FIGS. 2 and 3 each are a block diagram illustrating the configuration example of load 40.

As shown in FIGS. 2 and 3, the power supply system shown in FIG. 1 is applied to an electrically powered vehicle equipped with an electric motor for generating vehicle driving force, such as a hybrid vehicle and an electric vehicle.

Referring to FIG. 2, load 40 includes an inverter 41 connected to power lines 5 and 7, and a motor generator 42, for example. Motor generator 42 is representatively formed of a three-phase synchronous motor. Inverter 41 converts a DC voltage VH from boost converter 20 into a three-phase alternating-current (AC) voltage, and supplies the converted voltage to motor generator 42. Thereby, the power running operation is performed, in which motor generator 42 generates driving force with the electric power from battery 10. Representatively, inverter 41 is formed of a bridge circuit including switching elements of three phases.

On the other hand, during deceleration of the electrically powered vehicle, motor generator 42 generates electric power by the negative torque output, so that regenerative braking for converting deceleration energy into electric energy can be performed. During regenerative braking, inverter 41 converts the three-phase AC power generated by motor generator 42 into DC power, and outputs a DC voltage VH to power lines 5 and 7. Boost converter 20 shown in FIG. 1 can lower DC voltage VH for charging battery 10. Thereby, the regenerative operation by which battery 10 is charged with the electric power generated in motor generator 42 is performed.

Alternatively, referring to FIG. 3, load 40 is configured to include inverters 41 and 43 connected in parallel to power lines 5 and 7, and motor generators 42 and 44 connected to inverters 41 and 43, respectively. In such a configuration, an engine (not shown) may be further disposed, and one of the motor generators may generate electric power using the output from this engine. Such a system can apply each of a so-called series-parallel hybrid configuration in which a mechanical output from an engine can be used for both of power generation and vehicle driving force, and a series hybrid configuration that uses the engine output only for power generation.

Alternatively, in the configuration in FIG. 2, load 40 can be configured such that a fuel cell (not shown) is further disposed. In this way, the electrically powered vehicle to which the power supply system according to the present embodiment is applied is a concept including such an electric vehicle, a hybrid vehicle, a fuel cell vehicle, and the like.

Again referring to FIG. 1, control device 30 is representatively formed of an electronic control unit (ECU). In other words, control device 30 is configured to include a CPU (Central Processing Unit), a memory, an input/output (I/O) circuit, and an electronic circuit that are not shown, and controls the operation of power supply system 100 based on the detected value obtained by each sensor. Control device 30 generates control signal SE for controlling system relays SR1 and SR2 to be turning ON and OFF in accordance with startup/stop commands from power supply system 100. Control signal SE is generated such that system relays SR1 and SR2 are turned ON in accordance with startup of power supply system 100, and generated such that system relays SR1 and SR2 are turned OFF at the time when power supply system 100 is stopped.

Control device 30 receives detected values of a battery voltage Vb from voltage sensor 11, a battery temperature Tb from temperature sensor 12, a battery current Ib from current sensor 13, an input voltage VL from voltage sensor 14, and an output voltage VH from voltage sensor 15.

Control device 30 calculates an SOC (State Of Charge) that shows the remaining capacity of battery 10 mainly based on battery voltage Vb and battery current Ib. The SOC shows the present remaining capacity to the fully-charged state by percentage, as being known.

Furthermore, during the operation of power supply system 100, control device 30 generates switching control signals S1 and S2 for controlling the switching operations (ON/OFF operations) of switching elements Q1 and Q2 such that a desired voltage conversion is performed in boost converter 20 based on the above-described detected values.

Furthermore, control device 30 generates an operation command for load 40. In the case where load 40 includes a motor generator for generating vehicle driving force of the electrically powered vehicle as illustrated in FIG. 2 or 3, the operation command includes a torque command for the motor generator.

Then, the operation of power supply system 100 will be described.

During an ON period of each of system relays SR1 and SR2, battery voltage Vb that is an output voltage from battery 10 is applied between power line 5 and power line 6. Boost converter 20 receives a voltage VL on smoothing capacitor C1 connected to power line 5 and power line 6.

Boost converter 20 can boost DC voltage VL input from battery 10 by the switching operations of switching elements Q1 and Q2 according to switching control signals S1 and S2 from control device 30, to generate DC voltage VH between power line 5 and power line 7. DC voltage VH is smoothed by smoothing capacitor C2 and supplied to load 40.

Furthermore, boost converter 20 can lower DC voltage VH supplied from load 40 through smoothing capacitor C2 by the switching operations of switching elements Q1 and Q2 according to switching control signals S1 and S2, thereby allowing generation of DC voltage VL between power line 5 and power line 6. DC voltage VL is smoothed by smoothing capacitor C1 and used for charging battery 10.

Boost converter 20, which can operate as a converter capable of performing a bidirectional power conversion, will be mainly described in the present embodiment with regard to the voltage conversion operation of converting DC voltage VL supplied from battery (DC power supply) 10 into DC voltage VH that is to be supplied to load 40 (voltage boosting operation). Therefore, in the following description, DC voltage VL will be also referred to as an input voltage VL while DC voltage VH will be also referred to as an output voltage VH.

Figure 4:
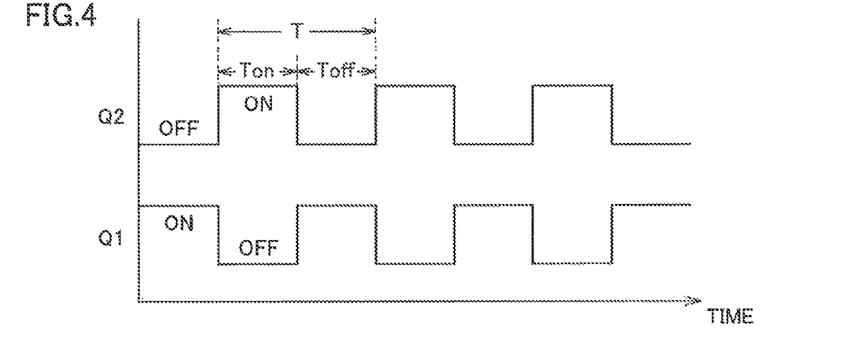
FIG. 4 is an operation waveform diagram illustrating the switching operation in a boost converter.

FIG. 4 is an operation waveform diagram illustrating the switching operation in boost converter 20.

Referring to FIG. 4, the ON period and the OFF period of switching element Q2 are alternately provided in accordance with a duty ratio d (d=Ton/T: ON period ratio) that has been set. In this case, T is a prescribed switching cycle (T=Ton+Toff).

Electric power from battery 10 is accumulated in reactor L during the ON period of switching element Q2 and electric power is supplied to load 40 from battery 10 and reactor L during the OFF period thereof. In other words, boost converter 20 operates as a so-called boost chopper.

The boost ratio (VH/VL) in the steady state of boost converter 20 during the voltage boosting operation is expressed by the following equation (1) as a function of duty ratio d (d=Ton/T).

$$VH = 1/(1-d) \cdot VL \tag{1}$$

Basically, switching element Q1 is turned ON or OFF complementarily to switching element Q2. In addition, even if switching element Q1 is always in the OFF state, boost converter 20 can be operated as a boost chopper. However, since a current can flow from power line 7 to power line 6 during the ON period of switching element Q1, the regenerative operation and the power running operation both can be implemented in the same switching pattern while controlling output voltage VH.

Furthermore, when voltage boosting is not required (VH=VL), in the state where d=0 holds, switching element Q1 is fixed to be ON while switching element Q2 can also be turned OFF. In this case, since no switching loss occurs in switching elements Q1 and Q2, the power loss in boost converter 20 can be suppressed.

In addition, in the case where only power supply from battery 10 to load 40 (that is, the power running operation) is performed, boost converter 20 can be formed only of switching element Q2 in the lower arm and diode D1 in the upper arm.

In other words, in the configuration in FIG. 1, boost converter 20 is configured such that switching element Q1 is disposed in the upper arm and diode D2 is further disposed in the lower arm, thereby allowing battery 10 to be charged with electric power supplied from load 40 (that is, the regenerative operation).

Figure 5:
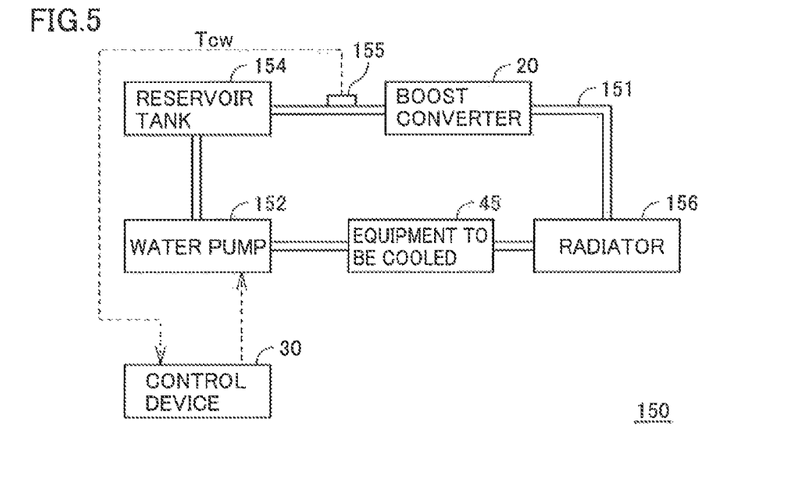
FIG. 5 is a block diagram illustrating a cooling mechanism of the boost converter.

FIG. 5 is a block diagram illustrating a cooling mechanism of boost converter 20.

Referring to FIG. 5, boost converter 20 is cooled by a cooling device 150. Cooling device 150 has a cooling pipe 151, a coolant pump 152, a reservoir tank 154, and a radiator 156 that are used for forming a coolant circulation path. The coolant used in cooling device 150 is representatively water (which will be hereinafter also referred to as cooling water). Therefore, coolant pump 152 will be hereinafter also referred to as a water pump 152.

Cooling pipe 151 is configured to cause the cooling water to circulate through the coolant circulation path including equipment as a target to be cooled (boost converter 20). The coolant circulation path is configured to cool the equipment as a target to be cooled (boost converter 20) by heat exchange between the heat-generated element and the cooling water when the cooling water passes through the equipment. The coolant circulation path is provided with a temperature sensor 155 for measuring a cooling water temperature Tcw. Cooling water temperature Tcw measured by temperature sensor 155 is sent to control device 30.

In the present embodiment, since the temperature state of boost converter 20 is estimated based on cooling water temperature Tcw, it is preferable that temperature sensor 155 is disposed in the vicinity of the downstream of boost converter 20 in the coolant circulation path. Cooling water temperature Tcw corresponds to a "coolant temperature".

Water pump 152 gives accelerating force to the coolant (cooling water) for causing this coolant to circulate through cooling pipe 151. The operation of water pump 152 is controlled by control device 30. For example, the rotation speed of water pump 152 is controlled in accordance with cooling water temperature Tow.

Radiator 156 is configured to cool the cooling water, which has been elevated in temperature by means of heat exchange, by heat dissipation or the like by air cooling. Equipment to be cooled 45 other than boost converter 20 may be further connected to cooling pipe 151, and cooled by the coolant circulation path shared with boost converter 20. For example, equipment to be cooled 45 can include inverters 41 and 43 and/or motor generators 42 and 44 that are shown in FIGS. 2 and 3.

Reservoir tank 154, which functions as a reserve tank of cooling water, is provided for accommodating the change in the volume of cooling pipe 151 that is caused by the temperature of the cooling water within cooling pipe 151 and by circulation of the cooling water therein. For example, by arranging reservoir tank 154, it becomes possible to prevent generation of air within cooling pipe 151 or in water pump 152, which is caused by lack of the capacity for the cooling water with respect to the volume of cooling pipe 151.

Again referring to FIG. 1, battery current Ib measured by current sensor 13 is a current that flows through reactor L in boost converter 20. In other words, battery current Ib corresponds to a passing current flowing through boost converter 20. Therefore, as battery current Ib increases, the temperature of boost converter 20 rises.

Figure 6:
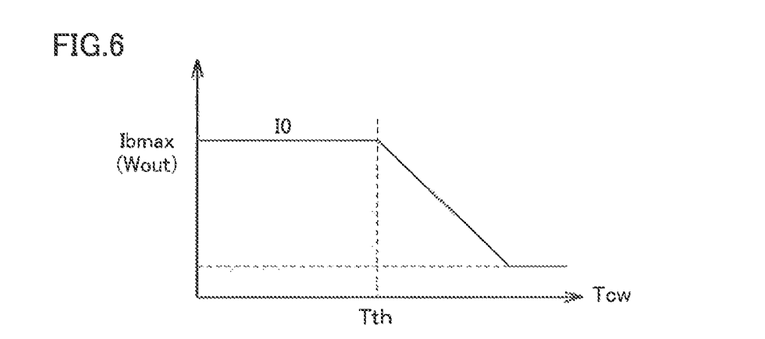
FIG. 6 is a conceptual diagram illustrating a map used for setting the maximum value of a battery current that flows through the boost converter, which is shown as a comparative example.

FIG. 6 is a map used for setting the maximum value of battery current Ib that flows through boost converter 20, which is shown as a comparative example. FIG. 6 shows an upper limit value Ibmax of the battery current (which will be hereinafter referred to as a current upper limit value Ibmax) from the aspect of thermal protection for protecting boost converter 20 from overheating. Current upper limit value Ibmax corresponds to a current upper limit value of the current that flows through boost converter 20.

Referring to FIG. 6, current upper limit value Ibmax is set in accordance with cooling water temperature Tcw detected by temperature sensor 155. Current upper limit value Ibmax is set at a default value I0 until the cooling water temperature exceeds a prescribed determination value Tth. This default value I0 is set equivalently to the rated value that is determined based on the current ratings and the like of battery 10 and each component. Specifically, the state where Ibmax=I0 holds is equivalent to the state where the current upper limit value of boost converter 20 is not set for thermal protection.

In contrast, when cooling water temperature Tcw exceeds determination value Tth, current upper limit value Ibmax is lowered below default value I0. Accordingly, final current upper limit value Ibmax is also to be limited from the aspect of thermal protection of boost converter 20.

In addition, the output power from battery 10 is limited by the product of current upper limit value Ibmax and battery voltage Vb of battery 10. Therefore, it is understood that the limitation on current upper limit value Ibmax is equivalent to the limitation on discharge power upper limit value Wout from battery 10.

For battery 10, discharge power upper limit value Wout and charge power upper limit value Win are usually set in accordance with the state of battery 10 (representatively, the SOC and battery temperature Tb). For example, Wout is limited when the SOC is low while Win is limited when the SOC is high. Furthermore, Win and Wout are limited when the temperature of battery 10 is relatively low or high.

Then, control device 30 generates an operation command for load 40 while limiting the input/output power of battery 10 so as to fall within a range of Win to Wout. For example, the torque command values of motor generators 42 and 44 shown in FIG. 2 and/or FIG. 3 are generated while limiting the sum of each electric power (rotation speed×torque command value) in motor generators 42 and 44 so as to fall within a range of Win to Wout.

According to the control in FIG. 6, at the time of a temperature rise in boost converter 20 detected based on cooling water temperature Tcw, boost converter 20 can be protected from overheating by limiting current upper limit value Ibmax of battery 10 and also by limiting the discharge power of battery 10 resulting therefrom. As a result, the components of boost converter 20 can be prevented from breaking down due to overheating.

However, the limitation on current upper limit value Ibmax or discharge power upper limit value Wout (which will be hereinafter also comprehensively referred to as an "output limitation") leads to a limitation on the electric power that can be used in load 40. Accordingly, in the power supply system applied to the electrically powered vehicle as shown in each of FIGS. 2 and 3, it is feared that the torque limitations in motor generators 42 and 44 may cause deterioration in driving performance such as deterioration in acceleration performance. In other words, it is preferable that the output limitation for thermal protection of boost converter 20 is minimized within the range in which the components can be prevented from breaking down due to overheating.

From the viewpoint as described above, the operation characteristics of boost converter 20 will be hereinafter further reviewed. Again referring to FIG. 1, in boost converter 20, a current flows through diode D1 of the upper arm when electric power is supplied to load 40 (during the power running operation). Accordingly, diode D1 tends to be an element exhibiting the highest temperature rise. Therefore, the overheat protection for boost converter 20 is actually equivalent to the overheat protection for diode D1. Then, the temperature rise characteristics in diode D1 will be described below with reference to FIG. 7.

Figure 7:
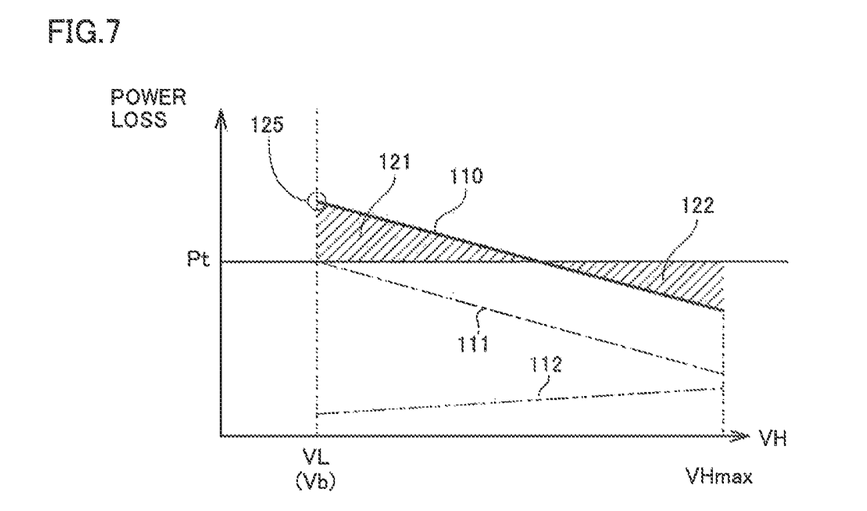
FIG. 7 is a graph for illustrating power loss characteristics of a diode disposed in an upper arm of the boost converter.

FIG. 7 is a graph for illustrating the power loss characteristics in diode D1 in the upper arm of boost converter 20.

In FIG. 7, the horizontal axis shows output voltage VH of boost converter 20 while the vertical axis shows the power loss in diode D1. The amount of heat generated in diode D1 is proportional to the power loss.

Referring to FIG. 7, the total power loss in diode D1 is shown by a characteristic line 110. The total power loss includes conduction loss Pd shown by a characteristic line 111, and ON/OFF loss Pl shown by a characteristic line 112. FIG. 7 shows the loss characteristics at the time when output voltage VH is changed under control of boost converter 20 from VL (VL=Vb) to control upper limit voltage VHmax in the state where output voltage Vb (VL=Vb) of battery 10 is constant. Control upper limit voltage VHmax corresponds to the upper limit voltage of output voltage VH, which is determined based on the withstand voltage ratings and the like of the components in the power supply system.

As can be understood from FIGS. 1 and 4, during the power running operation of boost converter 20, there alternately occur: a time period during which switching element Q2 of the lower arm is turned ON to store energy in reactor L (Ton in FIG. 4); and a time period during which switching element Q2 is turned OFF to supply the current to load 40 through diode D1 of the upper arm (Toff in FIG. 4). Then, as shown by the equation (1), duty ratio d of switching element Q2 increases as the boost ratio (VH/VL) increases. Consequently, it is understood that the time period during which the current flows through diode D1 decreases as output voltage VH rises.

Therefore, conduction loss Pd of diode D1 is represented by the following equation (2).

$$Pd=(VL/VH) \cdot Ib \cdot Vf \qquad (2)$$

Vf in the equation (2) represents a forward voltage of diode D1. Forward voltage Vf represents an inherent value depending on the performance of the diode element. It is understood from the equation (2) that conduction loss Pd is proportional to battery current Ib corresponding to the passing current flowing through boost converter 20, but is inversely proportional to the boost ratio (VH/VL).

On the other hand, ON/OFF loss Pl in diode D1 is represented by the following equation (3).

$$Pl=k \cdot VH \cdot Ib \qquad (3)$$

In this case, k in the equation (3) represents a proportionality coefficient. The equation (3) shows that the ON/OFF loss is proportional to the product of output voltage VH and current Ib that is turned ON or OFF.

In this way, in diode D1, conduction loss Pd decreases as output voltage VH rises. Due to this effect, the total power loss also decreases in accordance with an increase in output voltage VH, as shown by characteristic line 110.

FIG. 7 shows a threshold value Pt of the power loss for avoiding a temperature rise in diode D1, which is determined based on the relationship between the amount of heat generated in diode D1 and the cooling capacity by the cooling mechanism (FIG. 2).

In FIG. 7, in a region 121 where the total power loss is higher than threshold value Pt, the amount of generated heat caused by the total power loss in diode D exceeds the cooling capacity of the cooling mechanism. It is understood from the equations (2) and (3) that conduction loss Pd and ON/OFF loss Pl both can be decreased by reducing battery current Ib. Therefore, battery current Ib needs to be limited in region 121 in order to prevent a temperature rise in diode D1.

On the other hand, in a region 122 where the total power loss is lower than threshold value Pt, the temperature rise causes by the total power loss in diode D1 can be prevented by the cooling capacity of the cooling mechanism.

In this way, the power loss (that is, the amount of generated heat) in diode D1 changes, depending on output voltage VH, also with respect to the same battery current Ib. Particularly, it is understood that there exist a region requiring output limitations for thermal protection of boost converter 20 (121 in FIG. 7) and a region not requiring such output limitations (122 in FIG. 7), depending on whether output voltage VH is higher or lower. Rather, battery current Ib (a current flowing through boost converter 20) is still allowed to be increased in region 122.

It is to be noted that the power loss in the entire boost converter 20 is minimized in the state where VH=VL holds, at which the boost ratio is equal to 1.0. This is because switching element Q1 is fixed to be ON and switching element Q2 is turned OFF, so that ON/OFF loss does not occur in the switching elements. On the other hand, the power loss in diode D1 exhibits the maximum value in the case where VH=VL holds (operating point 125). Specifically, when output voltage VH is set so as to decrease the power loss of boost converter 20, heat is correspondingly generated in diode D1, thereby raising cooling water temperature Tcw, so that output limitations may be required.

In the comparative example shown in FIG. 6, current upper limit value Ibmax is set based only on cooling water temperature Tcw that has risen as a result of the temperature rise in boost converter 20. Therefore, current upper limit value Ibmax needs to be set such that at least the total power loss is lower than Pt so as to correspond to the amount of heat generated in diode D1 at operating point 125 (VH=VL) in FIG. 7, at which the amount of heat generated in diode D1 is maximized.

In contrast, the total power loss that defines the amount of heat generated in diode D1 as a target of overheat protection in boost converter 20 decreases as output voltage VH rises. Therefore, in the case where current upper limit value Ibmax is set only in accordance with cooling water temperature Tcw as in the comparative example in FIG. 6, current upper limit value Ibmax is set to be excessively low relative to output voltage VH. Consequently, it is feared that the output from battery 10 may be excessively limited. Thereby, it is feared that the electrically powered vehicle to which the power supply system is applied may be deteriorated in vehicle traveling performance by an excessive limitation on the torques of motor generators 42 and 44 (FIGS. 3 and 4) that form load 40.

Particularly, in the electrically powered vehicle, the induction voltage rises during the high rotation speed of each of motor generators 42 and 44, so that output voltage VH is also set to be higher accordingly. When current upper limit value Ibmax is excessively limited for thermal protection of boost converter 20 in such a situation where the motor generators are required to produce a high output, it is feared that the vehicle traveling performance may further deteriorate.

Therefore, in the power supply system according to the present embodiment, current upper limit value Ibmax for output limitations for overheat protection of boost converter 20 is set as described below, focusing attention on the loss characteristics in diode D1 that is to be a target of substantial overheat protection.

Figure 8:
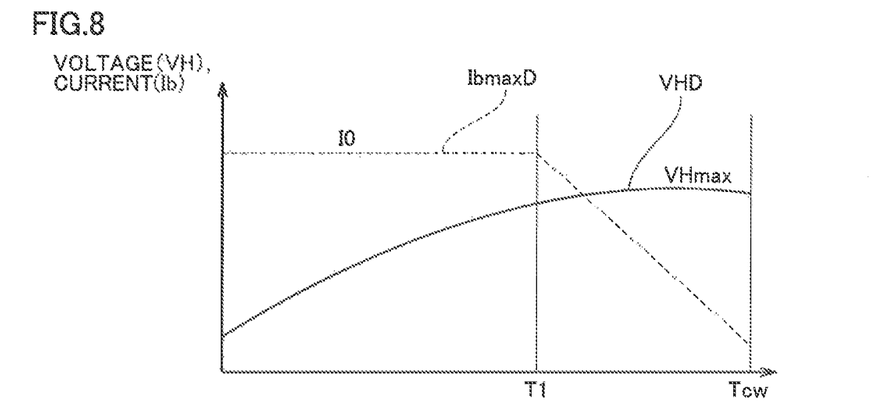
FIG. 8 is a conceptual diagram showing the correspondence relationship between a cooling water temperature and each of an output voltage and a current upper limit value of the boost converter in the power supply system according to the present embodiment.

FIG. 8 is a conceptual diagram showing the correspondence relationship between cooling water temperature Tcw and each of output voltage VH and a current upper limit value IbmaxD for thermal protection in the power supply system according to the present embodiment.

In FIG. 8, the horizontal axis shows cooling water temperature Tcw while the vertical axis shows output voltage VH of boost converter 20 and battery current Ib. As described above, battery current Ib is equivalent to a passing current flowing through boost converter 20.

In FIG. 8, current upper limit value IbmaxD defined for thermal protection of diode D1 is shown by a dotted line. Also, a lower limit value VHD of output voltage VH defined from the aspect of thermal protection of diode D1 (which will be hereinafter also referred to as a VH lower limit voltage VHD) is shown by a solid line.

Referring to FIG. 8, in a region where Tcw≤T1 holds, when the condition is set as VH≥VHD, diode D1 is not raised to an excessively elevated temperature without having to set the current upper limit value, namely, without setting battery current Ib equal to I0 (battery current Ib=I0 (FIG. 6)), from the aspect of thermal protection, that is, the setting of the current upper limit value of boost converter 20 for thermal protection can be canceled. In addition, in a region where cooling water temperature Tow is relatively low, an allowance for the temperature rise is relatively increased. When the boost ratio (VH/VL) is increased, the power loss in the entire boost converter 20 increases. Accordingly, VH lower limit voltage VHD is suppressed to a relatively low voltage in a region where cooling water temperature Tcw is relatively low.

On the other hand, in a region where Tcw>T1 holds, it becomes difficult to protect diode D1 from overheating even if the condition is set as VH=VHmax. Accordingly, it becomes necessary to set the condition as IbmaxD<I0. Thereby, current upper limit value Ibmax of battery 10 is to be limited for thermal protection of boost converter 20.

In this way, for boost converter 20 formed of a boost chopper, it is preferable to set the current upper limit value of boost converter 20 in consideration not only of cooling water temperature Tcw but also of the characteristics that the amount of heat generated in diode D1 changes in accordance with output voltage VH. For example, a map for setting current upper limit value IbmaxD from the aspect of thermal protection of boost converter 20 (diode D1) (a current upper limit value map) with respect to cooling water temperature Tcw and output voltage VH can be defined in advance in accordance with the characteristics shown in FIGS. 7 and 8.

For example, the current upper limit value map can be prepared in advance in accordance with VH lower limit voltage VHD determined in advance according to cooling water temperature Tcw in a region where Tcw≤T1 holds in FIG. 8, and so as to set the condition as IbmaxD=I0 in a region where VH z VHD holds.

Even in the region where Tcw≤T1 holds, the condition can be set as current upper limit value IbmaxD<Ib0 for thermal protection of boost converter 20 when VH<VHD holds. Also in this case, as current upper limit value IbmaxD is set with respect to DC voltage VH, the current limitation (that is, the limitation on the output from battery 10) can be minimized. Qualitatively, Ibmax is set to be lower as output voltage VH is lower.

In this way, even in the region where Tcw≤T1 holds, appropriate current limitations are imposed in accordance with DC voltage VH. Thereby, under the condition that the cooling performance by cooling device 150 (FIG. 5) is identical, a prescribed temperature T1 can be set on the higher temperature side than a determination temperature Tht in the comparative example in FIG. 5.

Furthermore, the current upper limit value map can be prepared in advance such that IbmaxD is set using output voltage VH and cooling water temperature Tcw as variables in a region where Tcw>T1 holds in FIG. 8. Particularly, when VH=VHmax holds, IbmaxD is set according to the dotted line in FIG. 8. On the other hand, when VH<VHmax holds, IbmaxD is set to fall within a region on the low current side from the dotted line shown in FIG. 8. At this time, IbmaxD is also set to be lower as output voltage VH is lower.

Figure 9:
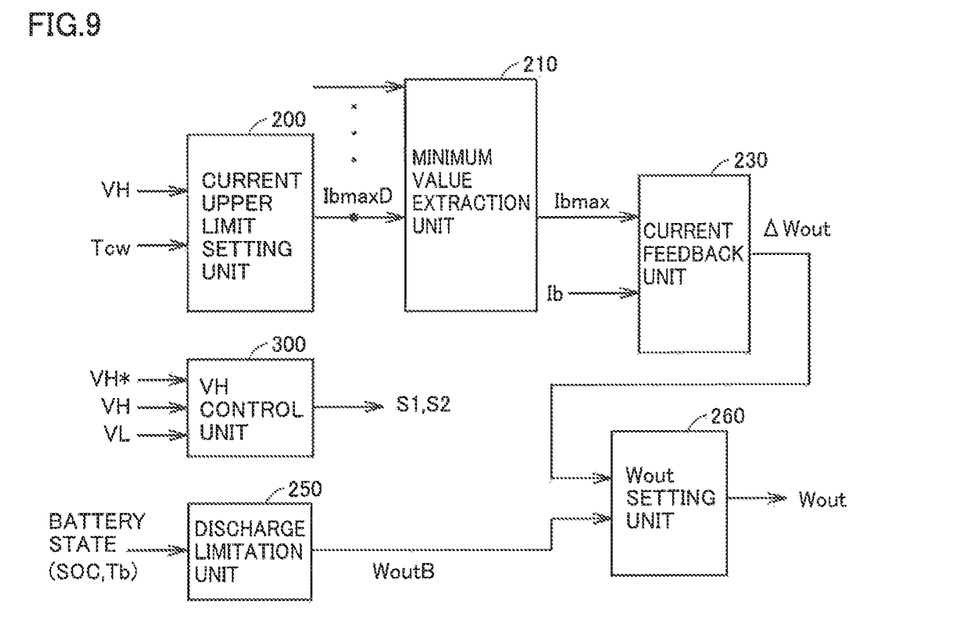
FIG. 9 is a functional block diagram illustrating the control for thermal protection of a boost converter according to the first embodiment.

FIG. 9 is a functional block diagram illustrating the control for thermal protection of boost converter 20 according to the first embodiment. In addition, each functional block in each block diagram including FIG. 9 is implemented by software processing by executing a prescribed program by control device 30 or hardware processing by a dedicated electronic circuit.

Referring to FIG. 9, a VH control unit 300 generates switching control signals S1 and S2 so as to perform duty ratio control in boost converter 20 such that output voltage VH becomes equal to voltage command value VH*. For example, a duty ratio d of boost converter 20 can be calculated by the combination of feedback control based on a voltage deviation (VH*−VH) between voltage command value VH* and output voltage VH and feedforward control in accordance with the voltage ratio between voltage command value VH* and input voltage VL. VH control unit 300 generates switching control signals S1 and S2 as shown in FIG. 4 in accordance with the calculated duty ratio d.

A current upper limit setting unit 200 sets current upper limit value IbmaxD from the aspect of thermal protection of boost converter 20 (diode D1) based on output voltage VH and cooling water temperature Tcw. Current upper limit setting unit 200 can set current upper limit value IbmaxD by referring to the above-described current upper limit value map while using, as variables, the detected value of output voltage VH obtained by voltage sensor 15 and the detected value of cooling water temperature Tcw obtained by temperature sensor 155.

A minimum value extraction unit 210 extracts the minimum value of the upper limit value of battery current Ib that is set based on various requirements, and sets the extracted minimum value as current upper limit value Ibmax of battery 10. For example, the upper limit values determined based on the requirements for protection such as thermal protection for other elements are also input into minimum value extraction unit 210.

Current upper limit value IbmaxD set by current upper limit setting unit 200 is input into minimum value extraction unit 210 as one of the upper limit values of these battery currents Ib. Therefore, when IbmaxD is lowered by current upper limit setting unit 200 below default value I0, current upper limit value Ibmax of battery 10 is set such that at least Ibmax≤IbmaxD holds. In the case where the upper limit values set based on the requirements for element protection including thermal protection of boost converter 20 are not set, the condition is set as Ibmax=I0 in accordance with rated values.

Based on the state of battery 10, discharge limitation unit 250 sets a base value WoutB of the discharge power upper limit value that is an upper limit value of the electric power that can be output from battery 10 to load 40. For example, the map for setting base value WoutB based on the SOC and battery temperature Tb can be defined in advance. For example, base value WoutB is decreased when the SOC decreases, and decreased also in a low temperature region and a high temperature region of battery 10.

A current feedback unit 230 compares current upper limit value Ibmax of battery 10 set by minimum value extraction unit 210 and battery current Ib detected by current sensor 13. When Ib>Ibmax holds, current feedback unit 230 sets a correction amount ΔWout for decreasing discharge power upper limit value Wout at a negative value in accordance with a deviation (Ibmax−Ib). On the other hand, when Ib≤Ibmax holds, the condition is set as ΔWout=0.

A Wout setting unit 260 sets a final discharge power upper limit value Wout of battery 10 in accordance with base value WoutB from discharge limitation unit 250 and correction amount ΔWout from current feedback unit 230. Specifically, the condition is set as Wout=WoutB+ΔWout.

Accordingly, when Ib≤Ibmax holds (ΔWout=0), discharge power upper limit value Wout is set in accordance with the state of battery 10 (Wout=WoutB). On the other hand, when Ib>Ibmax holds, the output from battery 10 is limited until the condition is set as Ib<Ibmax by lowering discharge power upper limit value Wout. As described above, by limiting the operation command of load 40, the output power of battery 10 can be controlled so as not to exceed Wout.

Consequently, when IbmaxD is decreased for thermal protection of boost converter 20, this decrease is reflected in current upper limit value Ibmax of battery 10, so that battery current Ib (the passing current of boost converter 20) can be controlled so as not to exceed Ibmax.

According to the power supply system of the first embodiment, current upper limit value IbmaxD is set based on cooling water temperature Tcw and output voltage VH during the control for thermal protection of boost converter 20. Thereby, as shown in FIG. 7, by reflecting the characteristics that the amount of heat generated in diode D1 as a main target of overheat protection in boost converter 20 decreases in accordance with an increase in output voltage VH, current upper limit value IbmaxD can be set as appropriate particularly in region 122 in FIG. 7.

Consequently, thermal protection of boost converter 20 can be implemented without having to excessively limit electric power in load 40 by the limitation on the output from battery 10. Therefore, in the power supply system applied to the electrically powered vehicle, the boost converter can be protected from overheating without excessively deteriorating the vehicle traveling performance.

Second Embodiment

In the second embodiment, an explanation will be given with regard to the control for further reliably limiting battery current Ib, that is, the passing current flowing through boost converter 20.

Figure 10:
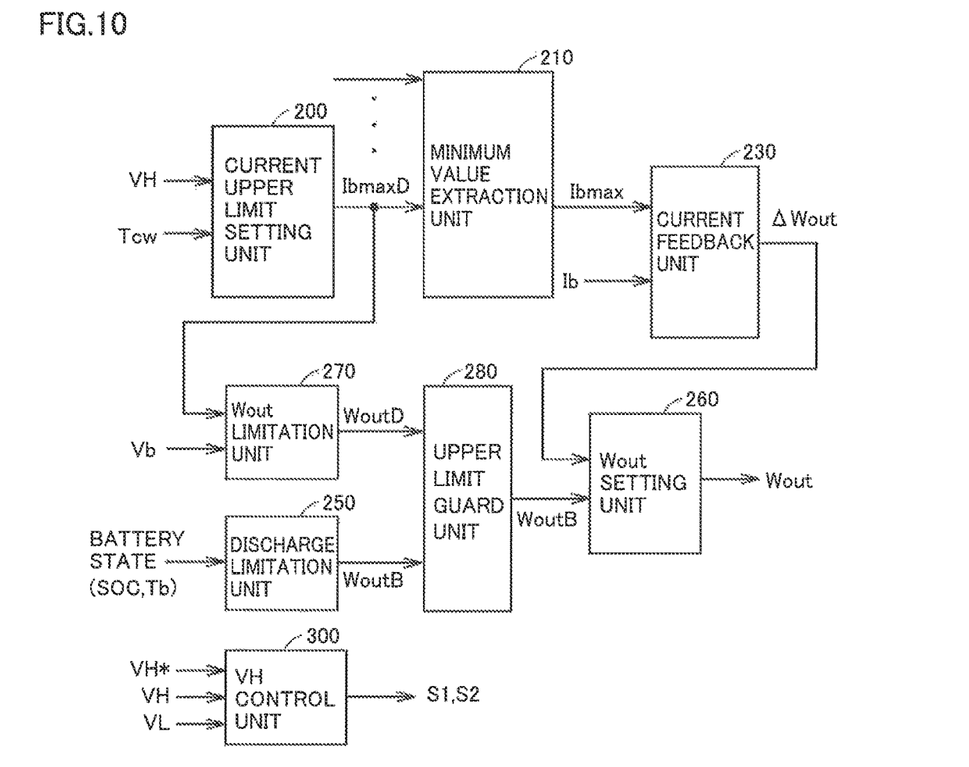
FIG. 10 is a functional block diagram illustrating the control for thermal protection of a boost converter according to the second embodiment.

FIG. 10 is a block diagram illustrating the control for thermal protection of a boost converter according to the second embodiment.

When comparing FIG. 10 with FIG. 9, a Wout limitation unit 270 and an upper limit guard unit 280 are further provided for the control according to the second embodiment.

Wout limitation unit 270 sets discharge power upper limit value WoutD for thermal protection of boost converter 20 in accordance with current upper limit value IbmaxD set by current upper limit setting unit 200 and battery voltage Vb detected by voltage sensor 11. Specifically, the condition is set as WoutD=IbmaxD*Vb.

Upper limit guard unit 280 serves to guard base value WoutB that is set by discharge limitation unit 250 so as not to exceed WoutD that is set by Wout limitation unit 270 in FIG. 9. In other words, upper limit guard unit 280 maintains WoutB when WoutB≤WoutD holds, and limits the condition to WoutB=WoutD when WoutB>WoutD holds.

Wout setting unit 260 sets final discharge power upper limit value Wout of battery 10 in accordance with WoutB from upper limit guard unit 280 and correction amount ΔWout from current feedback unit 230. Specifically, the condition is set as Wout=WoutB+ΔWout. Since other functional blocks in FIG. 10 function similarly to those in FIG. 9, detailed description there of will not be repeated.

In this way, when current upper limit value IbmaxD is decreased by current upper limit setting unit 200, discharge power upper limit value Wout can be immediately decreased to the value corresponding to current upper limit value IbmaxD without having to wait for current feedback unit 230 to set the condition as ΔWout<0.

Therefore, by the control according to the second embodiment, boost converter 20 can be further reliably protected from overheating as compared with the control according to the first embodiment.

Third Embodiment

In the third embodiment, the control for positively raising output voltage VH for thermal protection of boost converter 20 (diode D1) will be described.

Figure 11:
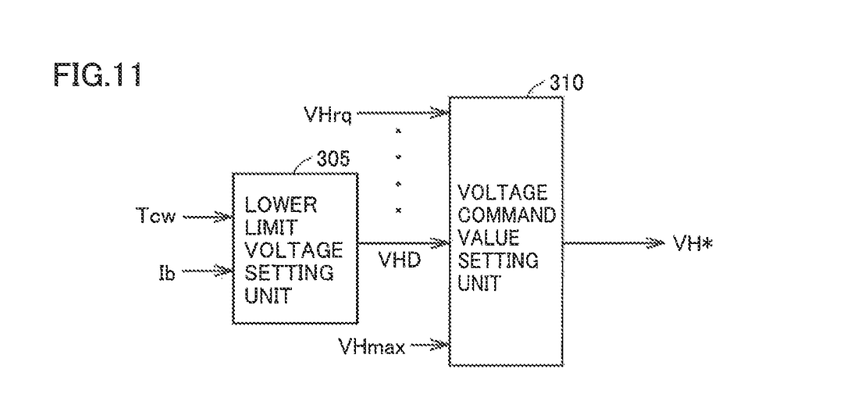
FIG. 11 is a functional block diagram illustrating the control for thermal protection of a boost converter according to the third embodiment.

FIG. 11 is a functional block diagram illustrating the control for thermal protection of a boost converter according to the third embodiment.

Referring to FIG. 11, the configuration according to the third embodiment is further provided with a lower limit voltage setting unit 305 and a voltage command value setting unit 310.

Lower limit voltage setting unit 305 sets VH lower limit voltage VHD from the aspect of thermal protection of boost converter 20 in accordance with cooling water temperature Tcw detected by temperature sensor 155 and battery current Ib detected by current sensor 13.

VH lower limit voltage VI-HD is set, for example, in accordance with the characteristics shown in FIG. 8. Specifically, in a region where Tc≤Tcw holds, VHD increases in accordance with cooling water temperature Tcw. Preferably, the condition is set as VHD=VHmax in a region where Tcw>T1 holds.

Figure 12:
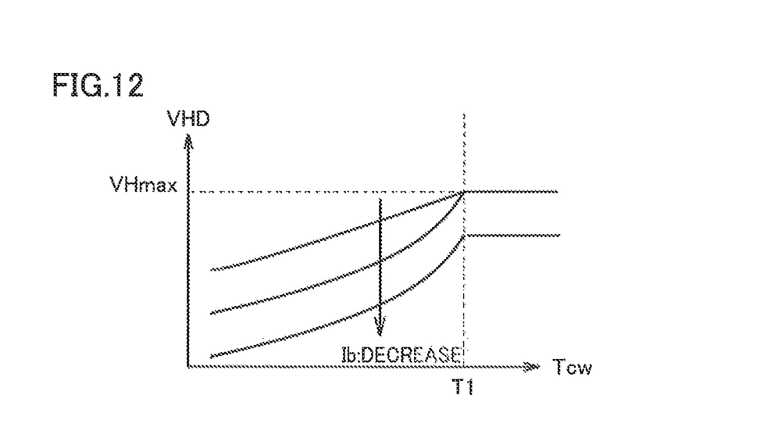
FIG. 12 is a conceptual diagram for illustrating a setting map of a VH lower limit voltage.

FIG. 12 shows the characteristics of VHD with respect to a constant battery current Ib. Therefore, it is understood that lower limit voltage VHD for eliminating the need of current limitations for thermal protection of boost converter 20 also changes as battery current Ib changes.

Therefore, in accordance with the results of real machine tests and simulations, a map for determining a VH lower limit voltage VHD (VHD map) can be set in advance using cooling water temperature Tcw and battery current Ib as variables.

Referring to FIG. 12, for example, in a region where Tcw<T1 holds, VH lower limit voltage VHD can be set so as to rise as cooling water temperature Tcw rises and so as to fall as battery current Ib decreases. On the other hand, basically, the condition is set as VHD=VHmax in a region where Tcw>T1 holds. Alternatively, the condition may be set as VHD<VHmax in a region where battery current Ib is relatively small.

Again referring to FIG. 11, in addition to lower limit voltage VHD that is set from the aspect of thermal protection of boost converter 20, voltage command value setting unit 310 receives control upper limit voltage VHmax and a requested lower limit voltage VHrq that is set in accordance with the operation state of load 40.

For example, as shown in FIGS. 2 and 3, in the case where load 40 is configured to include motor generators 42 and 44, the DC voltage supplied to inverters 41 and 43, that is, output voltage VH of boost converter 20, should be controlled to be set at a higher voltage than the amplitudes of the induction voltages on motor generators 42 and 44. In this case, requested lower limit voltage VHrq is mainly set in accordance with the rotation speed of each of motor generators 42 and 44.

Furthermore, for the purpose of protecting elements other than boost converter 20, the upper limit voltage for suppressing output voltage VH can also be included in the input of voltage command value setting unit 310. Furthermore, control upper limit voltage VHmax is also included in the input of voltage command value setting unit 310.

Voltage command value setting unit 310 sets voltage command value VH* to boost converter 20 by the upper/lower limit guard using these input values. Specifically, voltage command value VH* is set so as not to exceed the minimum value of the upper limit voltage. In other words, voltage command value VH* is set so as to fall within a range equal to or less than control upper limit voltage VHmax, or when the upper limit voltage for element protection is set, so as to fall within a range equal to or less than this upper limit voltage.

Voltage command value VH* is further set in accordance with the maximum value of the lower limit voltage within a range equal to or less than the above-described upper limit voltage. For example, the condition is set as VH*=VHrq when VHD<VHrq holds while the condition can be set as VH*=VHD when VHD≥VHrq holds.

Consequently, except for the case where that problems occurs in connection with other requirements, voltage command value VH* can be set to be equal to or greater than VHD with respect to lower limit voltage VHD for avoiding current limitations for thermal protection in boost converter 20.

Therefore, in the control for thermal protection of the boost converter according to the third embodiment, output voltage VH of boost converter 20 is positively raised, thereby allowing suppression of the amount of heat generated in boost converter 20 (diode D1). Consequently, for example, in a region where Tcw<T1 holds in FIG. 8, output voltage VH is raised while preferentially suppressing temperature rise in boost converter 20, so that it becomes possible to avoid occurrence of current limitations in boost converter 20, which lead to limitations on the output from battery 10.

Fourth Embodiment

It may be preferable for the electrically powered vehicle to increase the output from battery 10 for a short period of time in accordance with the vehicle state. For example, when the driver depresses an accelerator pedal, the output torque of a motor generator needs to be increased in order to achieve sufficient vehicle accelerating force. In this case, it is preferable to temporarily increase the output power from battery 10. Alternatively, it is preferable to temporarily increase the output power from battery 10 in order to ensure sufficient cranking torque also when starting the stopped engine, which is intermittently operated automatically in a hybrid vehicle.

On the other hand, even when the discharge power is slightly increased from the base value of the discharge power upper limit value determined based on the battery state such as an SOC and a battery temperature Tb, as long as it is only for a short period of time (for example, about several seconds), deterioration or the like of battery 10 is less likely to be influenced thereby.

In the fourth embodiment, an explanation will be given with regard to the control for reflecting current upper limit value Ibmax for thermal protection of boost converter 20 in the control for temporarily relaxing the discharge power upper limit value as described above.

Figure 13:
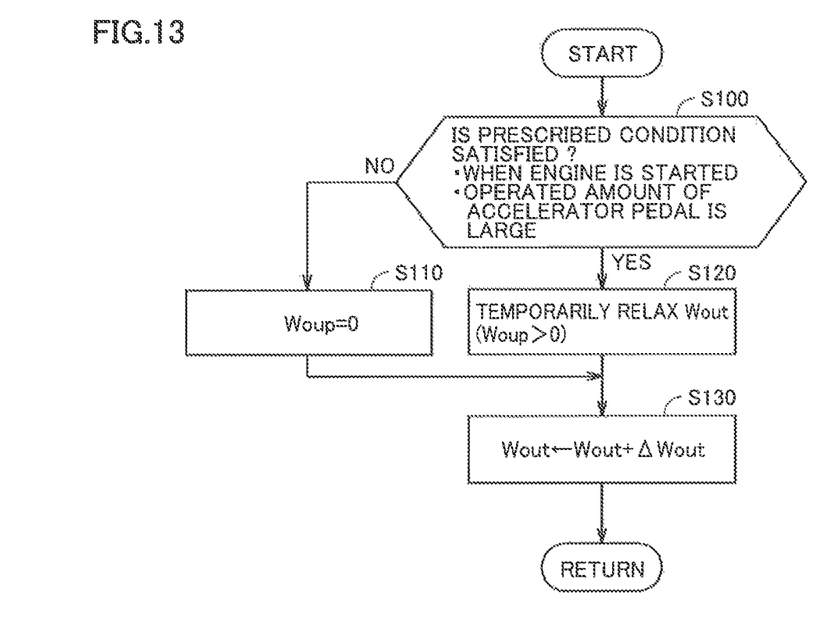
FIG. 13 is a flowchart illustrating a controlling process for temporarily relaxing a discharge power upper limit value from a battery in an electrically powered vehicle to which a power supply system according to the fourth embodiment is applied.

FIG. 13 is a flowchart illustrating a controlling process for temporarily relaxing the discharge power upper limit value from battery 10 in an electrically powered vehicle to which a power supply system according to the fourth embodiment is applied. The flowchart shown in FIG. 13 is repeatedly performed by control device 30 during vehicle traveling.

Referring to FIG. 13, control device 30 determines in steps S100 whether the prescribed condition is satisfied or not that shows the vehicle state requiring temporary relaxation of discharge power upper limit value Wout. For example, in step S100, it is determined as YES during the time period while the cranking torque is output in the case where the stopped engine is started, or during the time period while the amount of accelerator pedal operated by the driver exceeds a prescribed amount.

When the prescribed condition is not satisfied (determined as NO in S100), control device 30 advances the process to step S110 and sets an adding amount Woup of discharge power upper limit value Wout at zero (adding amount Woup=0).

On the other hand, when the prescribed condition is satisfied (determined as YES in step S100), control device 30 advances the process to step S120 and sets the adding amount of discharge power upper limit value Wout (Woup>0).

Further in step S130, control device 30 sets final discharge power upper limit value Wout by adding the adding amount Woup for temporary relaxation to discharge power upper limit value Wout that is set by Wout setting unit in FIG. 9 or FIG. 10.

Figure 14:
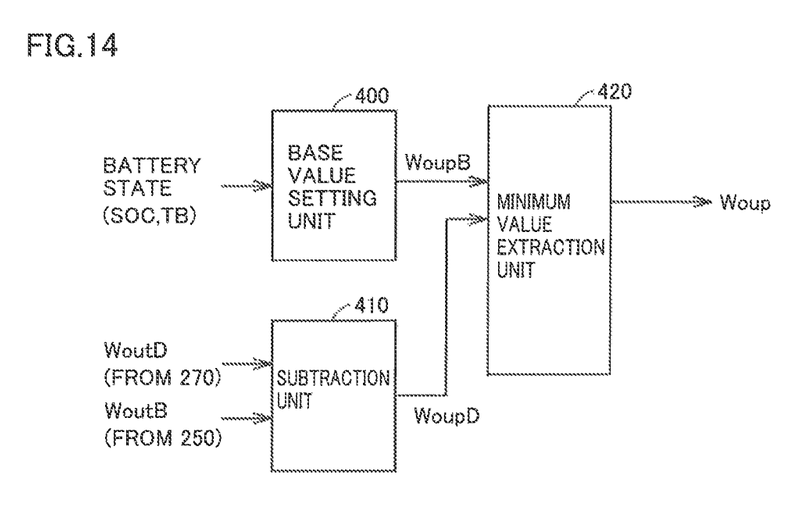
FIG. 14 is a functional block diagram illustrating the control for thermal protection of a boost converter according to the fourth embodiment.

FIG. 14 is a functional block diagram illustrating the control for thermal protection of a boost converter according to the fourth embodiment. FIG. 14 shows the control for setting adding amount Woup for temporary relaxation in consideration of thermal protection for the boost converter.

Referring to FIG. 14, base value setting unit 400 sets a base value WoupB showing the temporarily relaxing amount in accordance with the state of battery 10 (representatively, the SOC and Tb). For example, base value WoupB can be set to be higher when the SOC is high than when the SOC is low. Furthermore, when the temperature of battery 10 is relatively low or high, base value WoupB is also suppressed as compared with the case at the room temperature.

A subtraction unit 410 subtracts base value WoutB of the discharge power upper limit value that is set by discharge limitation unit 250 (FIG. 9) from discharge power upper limit value WoutD that is set in accordance with current upper limit value IbmaxD for thermal protection of boost converter 20. In addition, discharge power upper limit value WoutD can be calculated by calculation of WoutD=IbmaxD·Vb similarly to the calculation in Wout limitation unit 270 in FIG. 10.

Subtraction unit 410 outputs WoupD calculated by subtraction, that is, WoupD=WoutD−WoutB. WoupD obtained by subtraction unit 410 shows the upper limit value of the increasing amount of the discharge power limit value from base value WoutB. This upper limit value is defined so as not to exceed discharge power limit value WoutD set in accordance with current upper limit value IbmaxD for thermal protection of boost converter 20.

Minimum value extraction unit 420 extracts the minimum value of an upper limit value WoupD set by subtraction unit 410 and base value WoupB of the temporarily relaxing amount set by base value setting unit 400, and sets adding amount Woup for temporarily relaxing the discharge power upper limit value (step S120 in FIG. 13). Thereby, adding amount Woup can be set such that the temporarily relaxed discharge power limit value Wout (step S130 in FIG. 13) does not exceed discharge power upper limit value WoutD that is set in accordance with current upper limit value IbmaxD.

Therefore, according to the power supply system of the fourth embodiment, the vehicle traveling performance can be ensured by temporarily relaxing discharge power limit value Wout in accordance with the vehicle state while protecting boost converter 20 from overheating by controlling the current of boost converter 20 so as not to exceed current upper limit value Ibmax.

In addition, although a load configuration of the electric system of an electrically powered vehicle equipped with a power supply system is exemplified in FIGS. 2 and 3 in the present embodiment, it should be noted in terms of confirmation that the configuration of load 40 (FIG. 1) in the electrically powered vehicle is not limited to those described above.

Furthermore, the control for thermal protection of the boost converter in the present embodiment is implemented by paying attention to the characteristics of the amount of heat generated in the diode through which a power running current flows, and therefore, is applicable in common to a power supply system including a converter configured to include such a diode. Representatively, the control for thermal protection of the boost converter according to the present embodiment is applicable also to the case where an arrangement of switching element Q1 and diode D2 is eliminated from the boost converter configured only for a power running operation, specifically, from boost converter 20 in FIG. 1.

In the present embodiment, the VH control unit (FIG. 9 and the like) corresponds to a "voltage control unit", and Wout setting unit 260 (FIG. 9 and the like) corresponds to a "power limitation unit".

Although the embodiments of the present invention have been described as above, it should be understood that the embodiments disclosed herein are illustrative and non-restrictive in every respect. The scope of the present invention is defined by the terms of the claims, and is intended to include any modifications within the meaning and scope equivalent to the terms of the claims.

What is claimed is:

1. A power supply system of an electrically powered vehicle equipped with an electric motor for generating vehicle driving force, said power supply system comprising:
   a first power line on a high voltage side and a second power line on a low voltage side that are connected to a load including said electric motor;
   a power storage device storing electric power supplied to said electric motor;
   a boost converter connected between said power storage device and said load,
   said boost converter including
      a diode connected between said first power line and a first node so as to form a current path extending from said first node to said first power line,
      a switching element connected between said first node and said second power line, and
      a reactor connected in series to said power storage device between said first node and said second power line, said power supply system further comprising:
   a cooling device having a coolant circulation mechanism for cooling said diode and said switching element; and
   a control device controlling an operation of each of said boost converter and said load,
   said control device including
      a voltage control unit controlling said switching element to be turned ON or OFF in order to control a direct-current (DC) voltage between said first and second power lines,
      an upper limit current setting unit changing a current upper limit value of said boost converter in accordance with a change in each of a coolant temperature of said coolant circulation mechanism and said DC voltage, and
      a power limitation unit for limiting electric power of said load such that a current flowing through said boost converter does not exceed said current upper limit value, wherein
   said control device further includes
      a lower limit voltage setting unit setting a lower limit voltage of said DC voltage to rise as said coolant temperature rises, using said coolant temperature and the current of said boost converter as variables, and
      a voltage command value setting unit for setting a voltage command value of said DC voltage to fall within a voltage range higher than the lower limit voltage set by said lower limit voltage setting unit, and
   said voltage control unit controls said switching element to be turned ON or OFF for controlling said DC voltage in accordance with said voltage command value.

2. The power supply system according to claim 1, wherein in a region where said coolant temperature is lower than a prescribed determination temperature, said upper limit current setting unit cancels a setting of said current upper limit value when said DC voltage is higher than a prescribed lower limit voltage, and sets said current upper limit value to be lower as said DC voltage is lower when said DC voltage is lower than said prescribed lower limit voltage.

3. The power supply system according to claim 1, wherein in a region where said coolant temperature is higher than said determination temperature, said upper limit current setting unit sets said current upper limit value using said DC voltage and said coolant temperature as variables such that said current upper limit value is lower as said DC voltage is lower.

4. The power supply system according to claim 1, wherein said power limitation unit sets a discharge power upper limit value from said power storage device based on a sum of a base value set in accordance with a state of said power storage device and a correction amount set at a negative value when the current of said boost converter is higher than said current upper limit value, and an operation command of said load is generated while limiting an output voltage from said power storage device so as to fall within a range not exceeding said discharge power upper limit value.

5. The power supply system according to claim 4, wherein said power limitation unit limits said base value so as not to exceed a minimum value of a power upper limit value that is set in accordance with a product of said current upper limit value and a voltage of said power storage device.

6. The power supply system according to claim 4, wherein said control device is configured to temporarily relax said discharge power upper limit value in accordance with an operation state of said electrically powered vehicle, and said power limitation unit sets an adding amount of said discharge power upper limit value at a time of temporary relaxation so as to fall within a range in which said discharge power upper limit value after relaxation does not exceed the power upper limit value that is set in accordance with the product of said current upper limit value and the voltage of said power storage device.

7. A power supply system of an electrically powered vehicle equipped with an electric motor for generating vehicle driving force, said power supply system comprising:
  a first power line on a high voltage side and a second power line on a low voltage side that are connected to a load including said electric motor;
  a power storage device storing electric power supplied to said electric motor;
  a boost converter connected between said power storage device and said load,
  said boost converter including
    a diode connected between said first power line and a first node so as to form a current path extending from said first node to said first power line,
    a switching element connected between said first node and said second power line, and
    a reactor connected in series to said power storage device between said first node and said second power line, said power supply system further comprising:
  a cooling device having a coolant circulation mechanism for cooling said diode and said switching element; and
  a control device controlling an operation of each of said boost converter and said load,
  said control device including
    a voltage control unit controlling said switching element to be turned ON or OFF in order to control a direct-current (DC) voltage between said first and second power lines,
    an upper limit current setting unit changing a current upper limit value of said boost converter in accordance with a change in each of a coolant temperature of said coolant circulation mechanism and said DC voltage, and
    a power limitation unit for limiting electric power of said load such that a current flowing through said boost converter does not exceed said current upper limit value, wherein
  said power limitation unit sets a discharge power upper limit value from said power storage device based on a sum of a base value set in accordance with a state of said power storage device and a correction amount set at a negative value when the current of said boost converter is higher than said current upper limit value, and
  an operation command of said load is generated while limiting an output voltage from said power storage device so as to fall within a range not exceeding said discharge power upper limit value.

8. The power supply system according to claim 7, wherein in a region where said coolant temperature is lower than a prescribed determination temperature, said upper limit current setting unit cancels a setting of said current upper limit value when said DC voltage is higher than a prescribed lower limit voltage, and sets said current upper limit value to be lower as said DC voltage is lower when said DC voltage is lower than said prescribed lower limit voltage.

9. The power supply system according to claim 7, wherein in a region where said coolant temperature is higher than said determination temperature, said upper limit current setting unit sets said current upper limit value using said DC voltage and said coolant temperature as variables such that said current upper limit value is lower as said DC voltage is lower.

10. The power supply system according to claim 7, wherein said power limitation unit limits said base value so as not to exceed a minimum value of a power upper limit value that is set in accordance with a product of said current upper limit value and a voltage of said power storage device.

11. The power supply system according to claim 7, wherein
  said control device is configured to temporarily relax said discharge power upper limit value in accordance with an operation state of said electrically powered vehicle, and
  said power limitation unit sets an adding amount of said discharge power upper limit value at a time of temporary relaxation so as to fall within a range in which said discharge power upper limit value after relaxation does not exceed the power upper limit value that is set in accordance with the product of said current upper limit value and the voltage of said power storage device.

* * * * *